US008498235B2

(12) United States Patent  
Miki et al.

(10) Patent No.: US 8,498,235 B2
(45) Date of Patent: Jul. 30, 2013

(54) MOBILE COMMUNICATION SYSTEM, BASE STATION APPARATUS, USER APPARATUS AND METHOD

(75) Inventors: Nobuhiko Miki, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 267 days.

(21) Appl. No.: 12/919,397

(22) PCT Filed: Jan. 30, 2009

(86) PCT No.: PCT/JP2009/051619
§ 371 (c)(1),
(2), (4) Date: Oct. 13, 2010

(87) PCT Pub. No.: WO2009/107451
PCT Pub. Date: Sep. 3, 2009

(65) Prior Publication Data
US 2011/0032894 A1    Feb. 10, 2011

(30) Foreign Application Priority Data

Feb. 29, 2008  (JP) ................................. 2008-051087

(51) Int. Cl.
*H04B 7/14* (2006.01)
(52) U.S. Cl.
USPC .......................................................... 370/315
(58) Field of Classification Search
USPC .................. 370/315–350, 431–463
See application file for complete search history.

(56) References Cited

U.S. PATENT DOCUMENTS

| 7,116,651 | B2 * | 10/2006 | Hakkinen et al. | 370/329 |
| 7,730,191 | B2 * | 6/2010 | Otsuka et al. | 709/227 |
| 8,018,898 | B2 * | 9/2011 | Ofuji et al. | 370/329 |
| 8,045,507 | B2 * | 10/2011 | Kim et al. | 370/328 |
| 8,135,027 | B2 * | 3/2012 | Fujiwara et al. | 370/442 |
| 8,233,922 | B2 * | 7/2012 | Petrovic et al. | 455/458 |
| 2003/0014484 | A1 * | 1/2003 | Netzer et al. | 709/203 |
| 2009/0307552 | A1 * | 12/2009 | Harada et al. | 714/748 |
| 2010/0103867 | A1 * | 4/2010 | Kishiyama et al. | 370/320 |
| 2010/0232374 | A1 * | 9/2010 | Ofuji et al. | 370/329 |
| 2011/0032894 | A1 * | 2/2011 | Miki et al. | 370/329 |
| 2011/0149896 | A1 * | 6/2011 | Ofuji et al. | 370/329 |

OTHER PUBLICATIONS

International Search Report w/translation from PCT/JP2009/051619 dated Apr. 21, 2009 (4 pages).
Written Opinion from PCT/JP2009/051619 dated Apr. 21, 2009 (3 pages).
3GPP TSG RAN WG1 Meeting #46, R1-062087; "Views on TTI Length in E-UTRA"; NTT DoCoMo et al.; Tallinn, Estonia; Aug. 28-Sep. 1, 2006 (6 pages).

(Continued)

*Primary Examiner* — Fan Ng
(74) *Attorney, Agent, or Firm* — Osha Liang LLP

(57) ABSTRACT

A communication apparatus in a mobile communication system includes a first control information generation unit configured to generate first control information including retransmission information on a previously received data channel, a second control information generation unit configured to generate second control information including scheduling information on radio resources and a transmission signal generation unit configured to generate a transmission signal including a lower layer control channel including at least one of the first control information and the second control information. The transmission signal generation unit generates the transmission signal to transmit the first control information in any of subframes arriving at a first cycle and to transmit the second control information in any of subframes arriving at a second cycle longer than the first cycle.

11 Claims, 7 Drawing Sheets

OTHER PUBLICATIONS

3GPP TSG RAN WG1 Meeting #50bis, R1-074093; "Simultaneous UE transmission of ACK/NAK and CQI"; Samsung; Shanghai, China; Oct. 8-12, 2007 (2 pages).

Y. Kishiyama, et al.; "Investigations on Optimum Radio Parameter Set for OFDM Radio Access in Evolved UTRA Downlink"; IEICE Technical Report, vol. 105, No. 240, RCS2005-72; pp. 49-54; Aug. 2005 (6 pages).

3GPP TSG RAN WG Meeting #47bis, R1-070103; "Downlink L1/L2 Control Signaling Channel Structure: Coding"; Sorrento, Italy; Jan. 15-19, 2007 (17 pages).

* cited by examiner

FIG.7

| DISTANCE L BETWEEN UE AND eNB | 1ST PERIOD T1 | 2ND PERIOD T2 | 3RD PERIOD T3 ... |
|---|---|---|---|
| L1 | TTI | 2 × TTI | 3 × TTI |
| L2 | TTI | 2 × TTI | 4 × TTI |
| L3 | TTI | 3 × TTI | 5 × TTI |
| L4 | TTI | 4 × TTI | 6 × TTI |
| ... | ... | ... | ... |

MOBILE COMMUNICATION SYSTEM, BASE STATION APPARATUS, USER APPARATUS AND METHOD

TECHNICAL FIELD

The present invention relates to the technical field of mobile communications and more particularly relates to a mobile communication system, a base station apparatus, a user apparatus and a method that use the next generation mobile communication techniques.

BACKGROUND ART

In this type of technical field, mobile communication schemes, which may become successors of the so-called third generation, are being discussed by standardization group 3GPP for W-CDMA (Wideband-Code Division Multiplexing Access) scheme. Particularly, LTE (Long Term Evolution) and further successor mobile communication schemes are being intensively discussed as successors of the W-CDMA scheme, HSDPA (High Speed Downlink Packet Access) scheme, HSUPA (High Speed Uplink Packet Access) scheme and so on.

FIG. 1 illustrates a schematic view of a mobile communication system. The mobile communication system includes a cell 50, user apparatuses $100_1$, $100_2$, $100_3$ residing within the cell 50, a base station apparatus wirelessly communicating to the user apparatuses, an upper node 300 connected to the base station apparatus and a core network 400 connected to the upper node. The upper node 300 may be a radio network controller (RNC), an access gateway (aGW), a mobility management entity (MME) and so on, for example.

In such a mobile communication system, communications are conducted by assigning one or more resource blocks to the user apparatuses in any of uplinks and downlinks. The resource blocks are shared among a large number of user apparatuses within the system. The base station apparatus determines which of the several user apparatuses the resource blocks are assigned for every subframe having a time period such as 1 ms. The subframe may be referred to as a transmission time interval (TTI). The assignment of radio resources is called scheduling. In downlinks, the base station apparatus transmits shared channels to the scheduled user apparatuses in one or more resource blocks. The shared channel may be referred to as a PDSCH (Physical Downlink Shared Channel). In uplinks, the scheduled user apparatuses transmit shared channels to the base station apparatus in one or more resource blocks. The shared channel may be referred to as a PUSCH (Physical Uplink Shared Channel).

If the radio resources are scheduled, it is necessary to signal which of the user apparatuses the shared channel is assigned for every subframe. A downlink control channel for use in the signaling may include a PDCCH (Physical Downlink Control Channel) or a DL-L1/L2 control channel. The PDCCH may include information pieces such as a downlink scheduling grant, an uplink scheduling grant, an ACK/NACK (Acknowledgement/Non-Acknowledgement information) and a transmission power control command bit, for example. See non-patent document 2 in details, for example.

The downlink scheduling grant includes information on downlink shared channels, for example. Specifically, the downlink scheduling grant may includes information pieces such as assignment information of downlink resource blocks, identification of user apparatuses (UE-ID), the number of streams, information on precoding vectors, a data size, a modulation scheme and information on HARQ (Hybrid Automatic Repeat reQuest).

Also, the uplink scheduling grant includes information on uplink shared channels, for example. Specifically, the uplink scheduling grant may information pieces such as assignment information of uplink resources, identification of user apparatuses, a data size, a modulation scheme, uplink transmission power information and demodulation reference signal information in uplink MIMO.

The ACK/NACK indicates whether the PUSCH transmitted in uplinks has to be retransmitted.

In uplinks, user data (normal data signals) and the associated control information are transmitted in the PUSCH. Also separately from the PUSCH, downlink CQI (Channel Quality Indicator), ACK/NACK for the PDSCH and so on are transmitted in a PUCCH (Physical Uplink Control Channel). The CQI is used for scheduling and AMCS (Adaptive Modulation and Coding Scheme) in the PDSCH. In uplinks, a RACH (Random Access Channel), signals indicative of assignment requests of uplink and downlink radio resources may be transmitted if necessary.

On the other hand, since the mobile communication system includes radio links, there arise some types of signal delay that may not be caused in wired systems. The signal delay may be referred to as radio interface delay or air interface delay. From the viewpoint of faster communications, it is necessary to reduce the signal delay as much as possible.

FIG. 2 illustrates details of the air interface delay. As illustrated in FIG. 2, in addition to the air interface delay, channel delay and operations delay in RNC may be caused. However, the channel delay and the operation delay within the RNC can be significantly reduced and are not important to this application, and thus the channel delay and the operation delay are ignored. In general, the air interface delay includes (a) transmission delay, (b) retransmission delay and (c) reception delay. The transmission delay (a) represents a time period from transmission initiation to transmission completion of all signals. For example, in transmission of data equivalent to 1 TTI, a time period equivalent to about 1.5 TTI is required in whole considering delay for transmission operation. The retransmission delay (b) represents delay for retransmission control (HARQ). Suppose that it is defined in the system that if data transmitted in a certain TTI has to be retransmitted, the retransmission is conducted after 6 TTIs. There are cases that the retransmission is needed or not depending on radio transmission states. Supposing that the retransmission is needed at a likelihood of 50%, the delay of about 3 TTIs (=6 TTIs×½) might be caused in average. The reception delay (c) represents a time period required to receive and modulate transmitted data. In reception of data equivalent to 1 TTI, for example, a time period equivalent to about 2 TTIs may be required. Thus, the air interface delay can be estimated to be about 6.5 TTIs in whole. In this manner, the air interface delay is proportional to the TTI. This means that reduction in the TTI period can reduce the air interface delay. For example, if the TTI is shortened from 1.0 ms to 0.5 ms, the above air interface delay may be reduced from 6.5 ms to 3.25 ms.

The relationship between the air interface delay and the TTI is described in non-patent document 2, for example.

On the other hand, as stated above, if different radio resource assignment methods are applied to different subframes, the applied assignment method must be signaled to user apparatuses for each of the subframes. Even if the TTI is shortened, the information amount required for the signaling may not be significantly changed.

The left side in FIG. 3 schematically illustrates a downlink channel arrangement in the case of TTI=1.0 ms. One or more of a large number of (frequency) resource blocks are assigned to certain users. The assignment methods are signaled in a L1/L2 control channel. The right side in FIG. 3 schematically illustrates a downlink channel arrangement in the case of TTI=0.5 ms. As illustrated, the TTI is shortened by half while the transmission frequency of the L1/L2 control channel is doubled. The proportion of the amount of control information per unit time such as 1.0 ms (proportion of overhead) increases for shorter TTI, and accordingly the data throughput decreases. From the viewpoint of the data throughput, it is desirable to make the TTI longer and decrease the overhead proportion per unit time, as illustrated in the left side in FIG. 3.

Non-patent document 1: 3GPP R1-070103, Downlink L1/L2 Control Signaling Channel Structure: Coding Non-patent document 2: Yoshihisa Kishiyama, Kenichi Higuchi, Hiroyuki Atarashi and Mamoru Sawahashi, "Investigations on Radio Parameter Set for OFDM Radio Access in Evolved UTRA Downlink", IEICE Tech. Rep., vol. 105, no. 240, RCS2005-72, pp. 49-54, August 2005

DISCLOSURE OF INVENTION

Problem to be Solved by the Invention

One object of the present invention is to reduce air interface delay while suppressing overhead increase per unit time.

Means for Solving the Problem

In the present invention, a communication apparatus in a mobile communication system is used. A communication apparatus includes a first control information generation unit configured to generate first control information including acknowledgement information on a previously received data channel, a second control information generation unit configured to generate second control information including scheduling information on radio resources and a transmission signal generation unit configured to generate a transmission signal including a lower layer control channel including at least one of the first control information and the second control information. The transmission signal generation unit generates the transmission signal to transmit the first control information in any of subframes arriving at a first cycle and to transmit the second control information in any of subframes arriving at a second cycle longer than the first cycle.

Advantage of the Invention

According to the present invention, it is possible to reduce the air interface delay while suppressing overhead increase per unit time.

BRIEF DESCRIPTION OF DRAWINGS

FIG. 7 illustrates exemplary cycle variations depending on distances between a user and a base station wherein control information is classified into three or more.

LIST OF REFERENCE SYMBOLS

Figure 1:
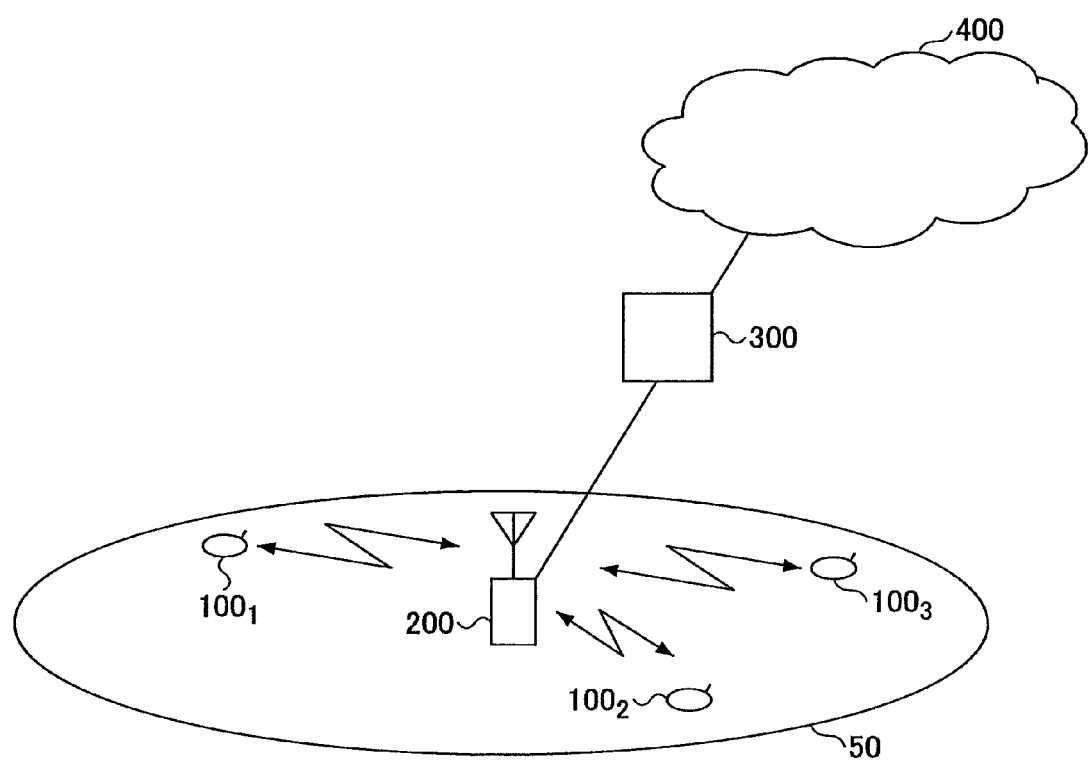
FIG. 1 illustrates a schematic view of a mobile communication system.
Figure 2:
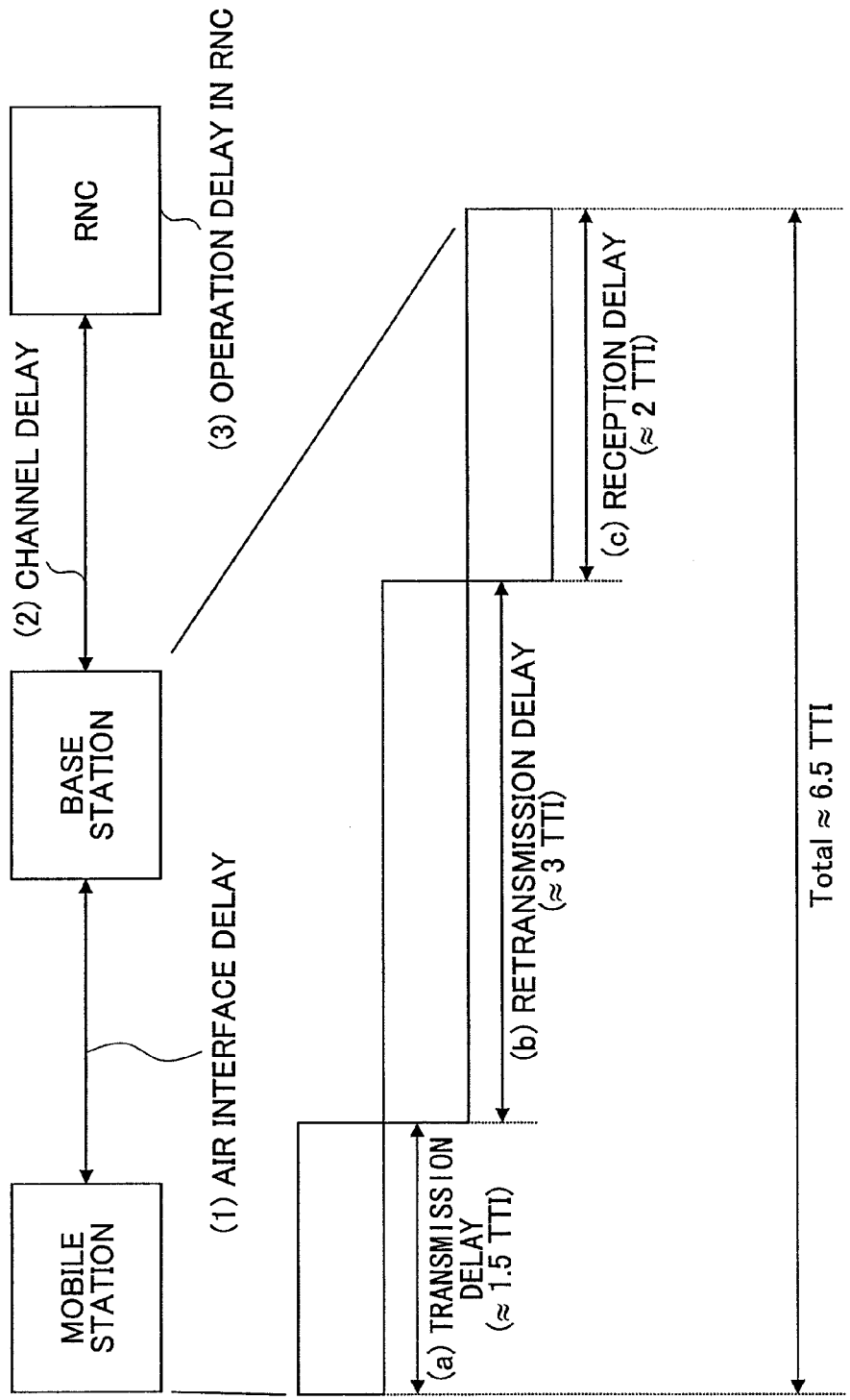
FIG. 2 illustrates details of air interface delay.

50: cell
$100_1$, $100_2$, $100_3$: user apparatus
200: base station apparatus
300: upper node
400: core network
51: TTI control unit
52: scheduler
53: lower layer control channel generation unit
54: upper layer control information generation unit
55: broadcast information generation unit
56: downlink data channel generation unit
57: multiplexing unit
58: uplink control information extraction unit
61: lower layer control information restoration unit
62: downlink data channel restoration unit
63: uplink data channel generation unit

BEST MODE FOR CARRYING OUT THE INVENTION

Embodiments of the present invention are described below with reference to the accompanying drawings.

Embodiment 1

[Operation Principle]

Figure 4:
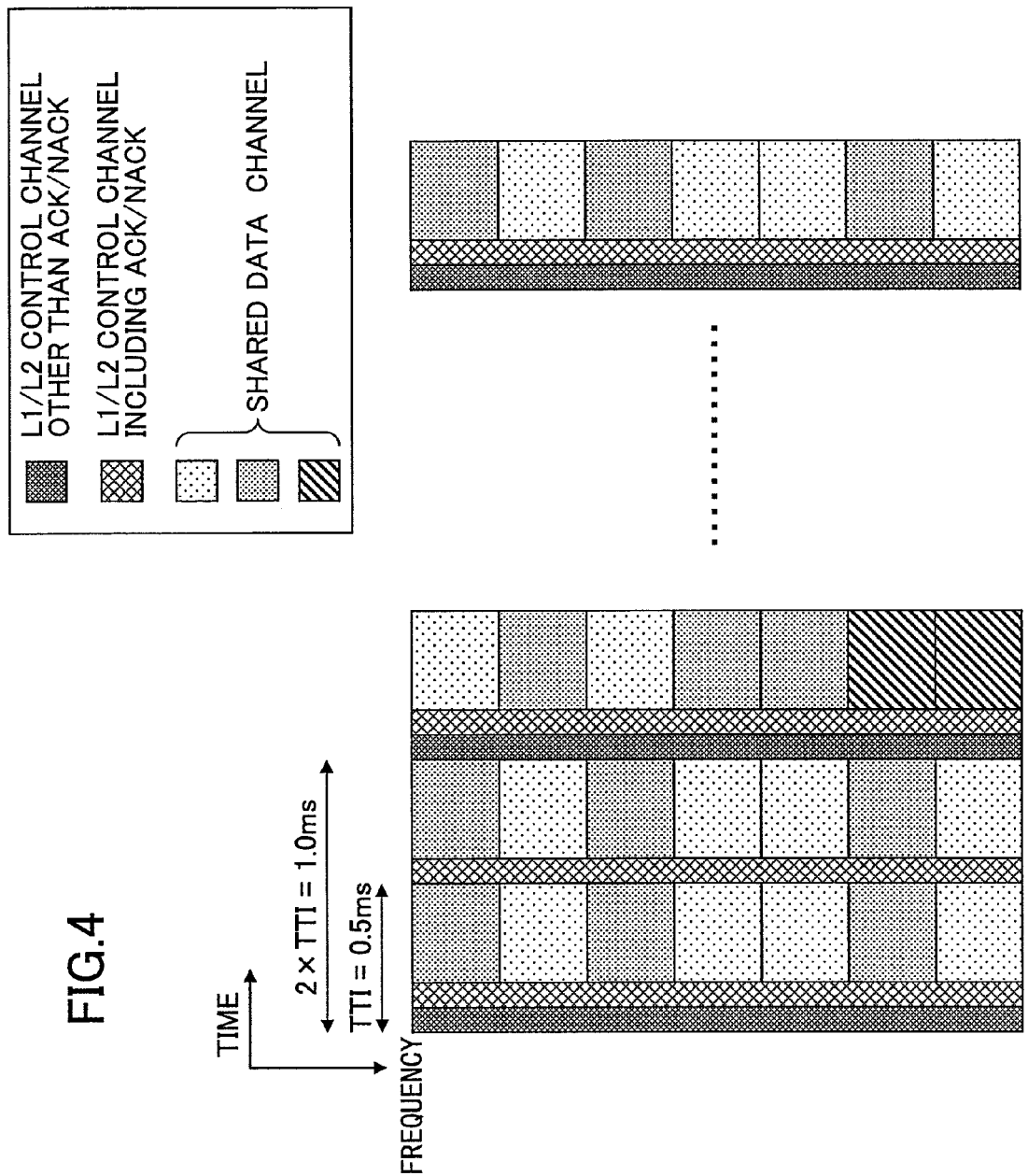
FIG. 4 illustrates an operation principle of the present invention.

FIG. 4 illustrates operation principle of an embodiment. In this embodiment, a short subframe is set. As one example, a conventional subframe is equal to 1.0 ms while the short subframe of the present embodiment is equal to 0.5 ms. However, these numerical values are simply illustrative, and any other appropriate numerical values may be used. For example, the subframe may be set to 0.1 ms.

In this embodiment, information transmitted in downlink control channels is classified into first control information and second control information.

The first control information includes retransmission information on uplink data channels that a base station apparatus received beforehand. The retransmission information indicates information for use in retransmission control such as packet numbers, puncture patterns of transmitted packets and so on. The retransmission information may include acknowledgement information represented as ACK indicative of no need of retransmission or NACK indicative of need of retransmission.

The second control information may include control information other than the retransmission control information. Typically, the second control information may include downlink and/or uplink scheduling information, AMC information, transmission power control information (TPC information) and so on. The AMC information indicates which of predefined combinations of data modulation schemes and channel coding rates is used in AMCS (Adaptive Modulation and Coding Scheme).

As illustrated, the first control information may be transmitted in subframes arriving every 1×TTI=0.5 ms. More generally, the first control information may be transmitted in any of the subframes arriving at a first cycle (0.5 ms). On the other hand, the second control information is transmitted in subframes arriving every 2×TTI=1.0 ms. More generally, the second control information may be transmitted in any of the subframes arriving at a second cycle (1.0 ms) longer than the first cycle. Since the second control information is transmitted every 1.0 ms, it seems that the second control information is transmitted in conventional 1.0 ms without reduction in TTI. As stated below, according to the present embodiment, the first control information can be transmitted at the shortest cycle while the apparent TTI length for the second control information can be adaptively changed. For convenience, the second cycle $T_2$ is set to be an integral multiple of the first cycle $T_1$ ($T_2$=N×$T_1$), and information for indicating how many multiples of the first cycle $T_1$ the second cycle $T_2$ is equal to is referred to as TTI information. The TTI information indicates the value of N where N is a natural number greater than or equal to 2.

Figure 3:
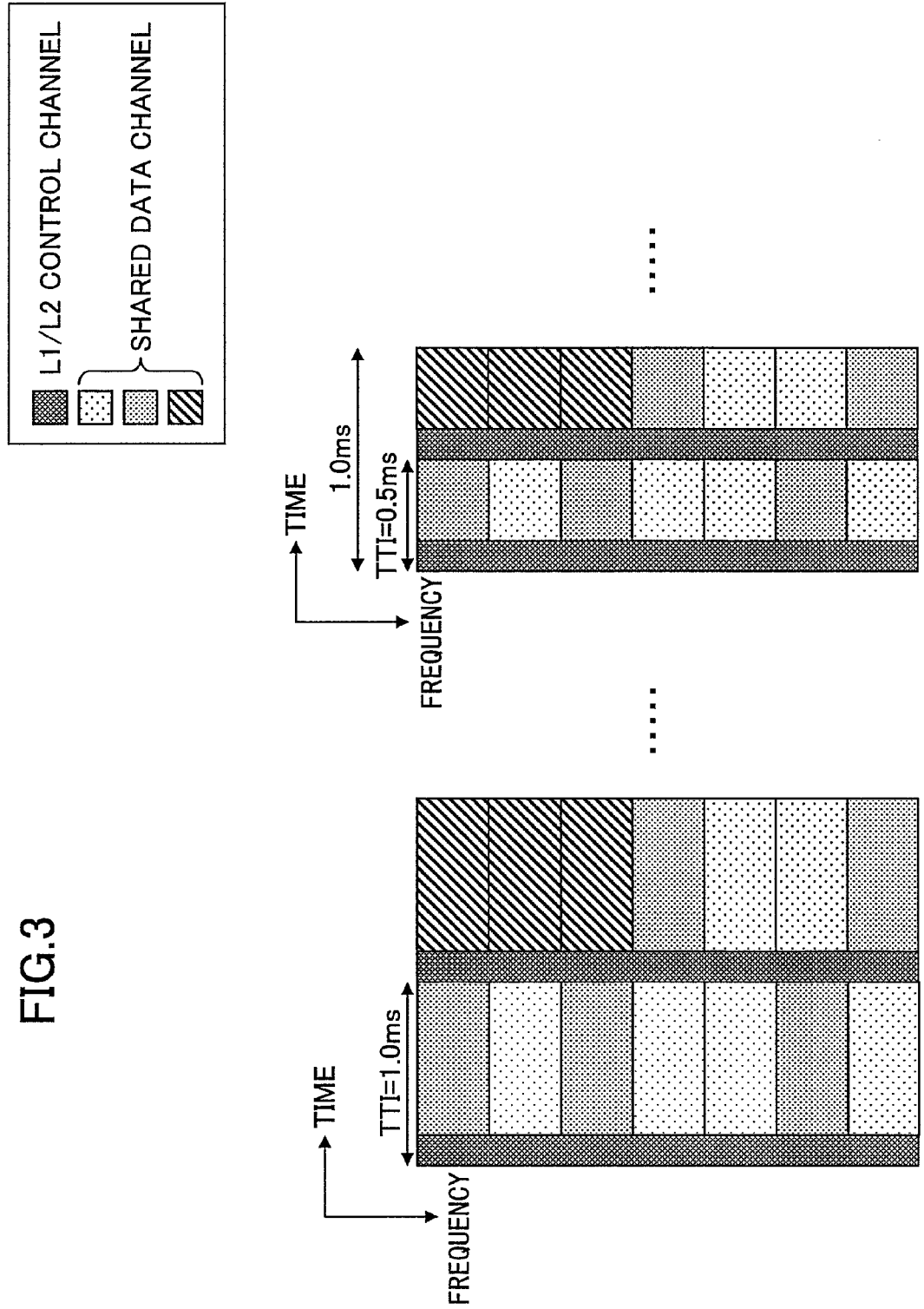
FIG. 3 illustrates the relationship between TTI lengths and overhead amounts.

If the first control information is generated, an opportunity to transmit the first control information is provided with a higher frequency. Thus, the present embodiment is preferred to reduce retransmission delay effectively. In the case where the second control information is transmitted at the same frequency as a conventional one, overhead increase due to the second control information might be substantially equal to 0. For this reason, assuming that the proportion of the overhead per 1.0 ms is equal to "1" in the case illustrated in the left side in FIG. 3, the proportion may be equal to "2" in the case of the right side in FIG. 3 and to "1+α" in the case of FIG. 4. Since α has an information amount equivalent to ACK/NACK, α may be much smaller than "1" (α<1). Thus, in the case illustrated in FIG. 4, the overhead increase can be highly alleviated compared to the case of the right side in FIG. 3. As the difference between the first cycle (TTI) and the second cycle (N×TTI) is greater, this tendency becomes more remarkable.

According to this embodiment, opportunities to transmit the retransmission control information are ensured with higher frequencies, and other control information is transmitted with lower frequencies. In this manner, it is possible to reduce the retransmission delay and accordingly the air interface delay while suppressing the overhead increase.

[Base Station Apparatus (eNB)]

Figure 5:
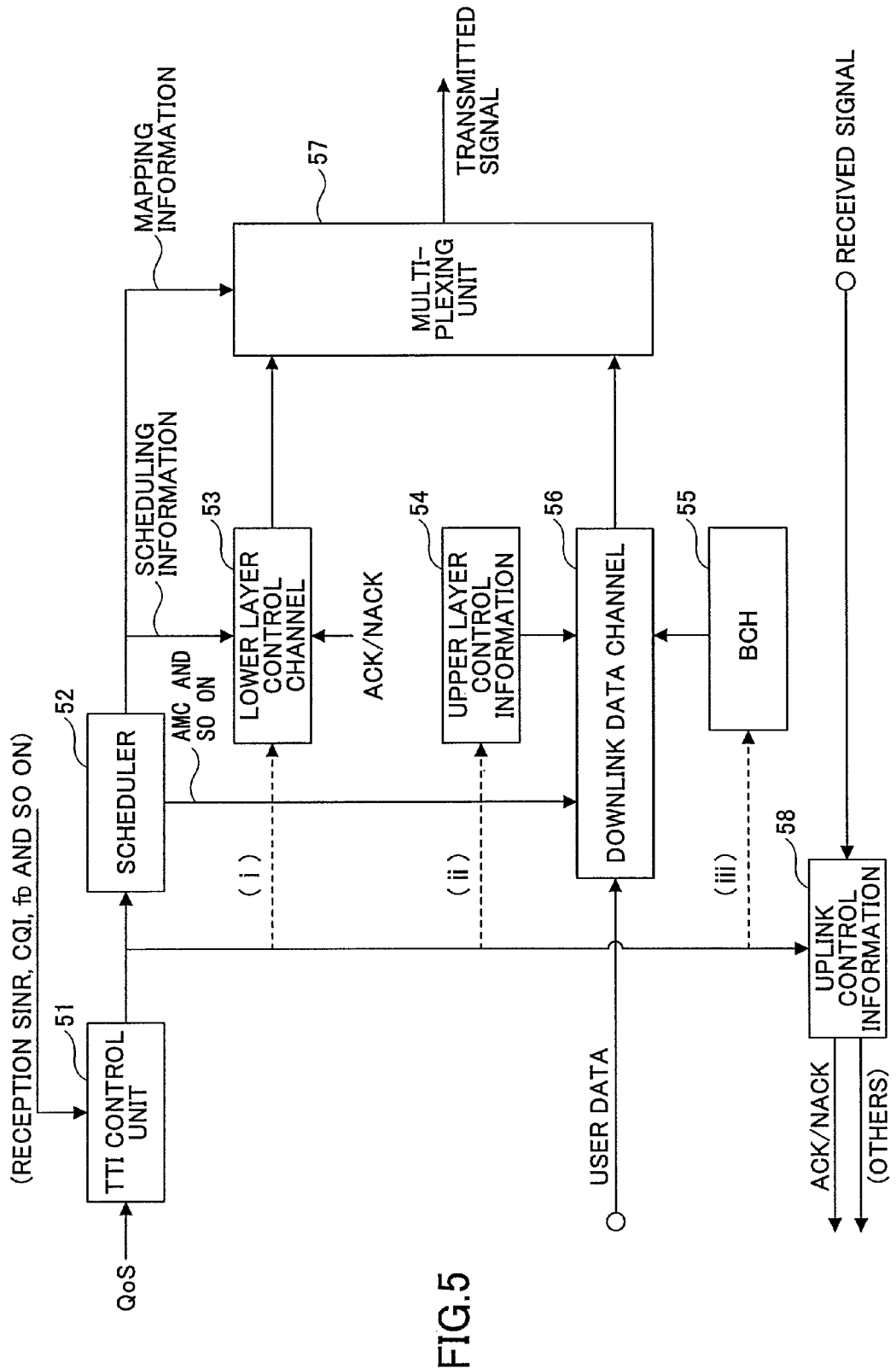
FIG. 5 illustrates a base station apparatus according to one embodiment of the present invention.

FIG. 5 illustrates a base station apparatus according to one embodiment of the present invention. In FIG. 5, a TTI control unit 51, a scheduler 52, a lower layer control channel generation unit 53, an upper layer control information generation unit 54, a broadcast information generation unit 55, a downlink data channel generation unit 56, a multiplexing unit 57 and an uplink control information extraction unit 58 are illustrated.

The TTI control unit 51 determines the value of N indicated in TTI information depending on states. In the above-mentioned operation principle, N is set to 2 (N=2), and $T_2$ is set to 2×$T_1$=2×TTI ($T_2$=2×$T_1$=2×TTI). The TTI information indicative of the relationship between the first cycle and the second cycle may be transmitted (i) as lower layer control information, (ii) as upper layer control information to individual users, or (iii) as broadcast information being user common information to user apparatuses. From the viewpoint of user-by-user control, (i) and (ii) are desirable. From the viewpoint of adaptive and frequent modifications, (i) is desirable. From the viewpoint of overhead reduction in downlinks, (iii) is desirable.

The scheduler 52 schedules radio resources based on the TTI information (the value of N) determined by the TTI control unit 51. The scheduling may be conducted in any known appropriate algorithm in this technical field. As one example, the scheduling may be conducted in accordance with maximum C/I method or proportional fairness method. Downlink and/or uplink scheduling information is supplied to the lower layer control channel generation unit 53. Since the scheduling information indicates correspondence between transmitted information and frequency and time, the correspondence is supplied to the multiplexing unit 57 as mapping information. The scheduler 52 determines a data modulation scheme and a channel coding rate to be applied to a data channel and supplies them as AMC information to the downlink data channel generation unit 56.

The lower layer control channel generation unit 53 generates control information to be transmitted in a downlink L1/L2 control channel and performs predefined channel coding and data modulation on the control information, for example, to generate a lower layer control channel such as a L1/L2 control channel. The control information includes the above-mentioned first and second control information. The first control information includes at least acknowledgement information for uplink shared data channels previously received at the base station apparatus. In addition to the acknowledgement information, the first control information may include information for use in retransmission control such as a packet number and a puncture pattern of transmitted packets. The second control information may include control information other than the retransmission control related information.

The upper layer control information generation unit 54 generates information such as L3 control information and supplies the information to the downlink data channel generation unit 56.

The broadcast information generation unit 55 generates broadcast information (BCH) to broadcast to user apparatuses within a cell and supplies the broadcast information to the downlink data channel generation unit 56.

The downlink data channel generation unit 56 receives user data, upper layer control information and broadcast information and generates downlink data channels by performing data modulation and channel coding on signals including the data and information.

The multiplexing unit 57 multiplexes the lower layer control channels and the downlink data channels. The multiplexing is conducted based on time division multiplexing and frequency division multiplexing. The multiplexed signal may have a format illustrated in FIG. 4.

The uplink control information extraction unit 58 extracts and restores uplink control information from received uplink signals.

[User Apparatus (UE)]

Figure 6:
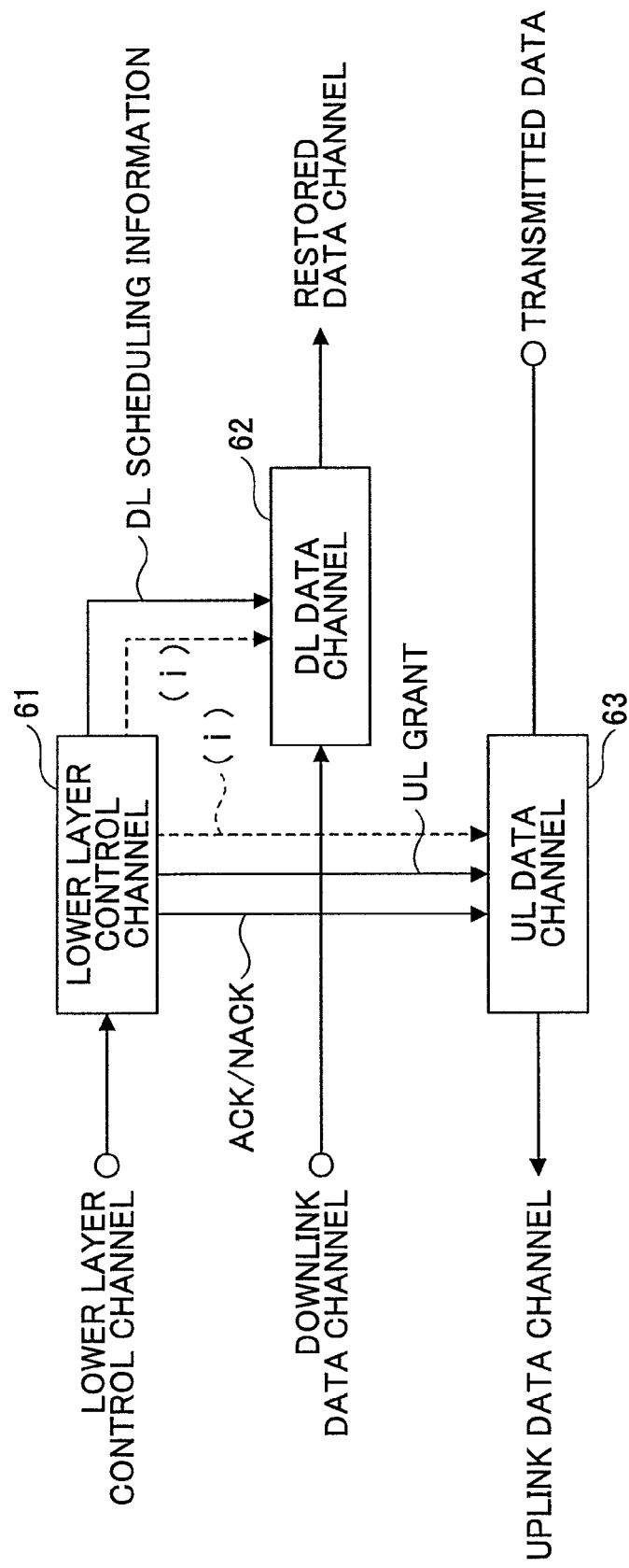
FIG. 6 illustrates a user apparatus according to one embodiment of the present invention.

FIG. 6 illustrates a user apparatus according to one embodiment of the present invention. In FIG. 6, a lower layer control information restoration unit 61, a downlink data channel restoration unit 62 and an uplink data channel generation unit 63 are illustrated.

The lower layer control information restoration unit 61 decodes and demodulates a lower layer control channel received from the base station apparatus and extracts control information. The control information includes first control information (e.g., a packet number, a puncture pattern and ACK/NACK) and second control information (other control information). The first control information is supplied to the uplink data channel generation unit 63. Downlink scheduling information in the second control information is supplied to the downlink data channel restoration unit 62. Uplink scheduling grant in the second control information is supplied to the uplink data channel generation unit 63. In the case where the above TTI information is transmitted as lower layer control information (the above-mentioned case (i)), the TTI information is also extracted in the lower layer control information restoration unit 61.

The downlink data channel restoration unit 62 extracts a downlink data channel in accordance with downlink scheduling information and restores the downlink data channel through demodulation and decoding. The TTI information is extracted as upper layer control information or broadcast information (the above-mentioned case (ii) or (iii)) at the downlink data channel restoration unit 62.

The uplink data channel generation unit 63 generates an uplink data channel in accordance with an uplink scheduling grant. The uplink data channel generation unit 63 generates a new uplink data channel or an uplink data channel for retransmission depending on retransmission control information (ACK/NACK) transmitted from the lower layer control information restoration unit 61.

[Variations]

The TTI information determined by the TTI control unit 51 in FIG. 5 may be uniform within the mobile communication system or for each cell or may be different for individual users. More generally, the TTI information indicating how many multiples of the first cycle the second cycle corresponds to (the multiple is denoted as N) may be adaptively determined for each user depending on various conditions. In other words, it may be determined based on the various conditions how often a transmission opportunity of the control information (particularly the second control information) should be ensured. The conditions may include, but not limited to, (1) reception SINR of uplink pilot channels, (2) CQI (Channel Quality Indicator) derived from reception SINR of downlink pilot channels and reported from user apparatuses, (3) distances between users and the base station apparatus, (4) user mobility (Doppler frequency), (5) user's requested signal quality (QoS) and so on. Alternatively, the value of N may be arbitrarily determined for a certain user by an operator or others.

(1) The reception SINR of uplink pilot channels corresponds to quality of radio transmission states. If a certain user has a better radio transmission state, less radio resources can be used to transmit control information to the certain user. Even if the same amount of control information is transmitted, more radio resources would be needed under a poor radio transmission state. For this reason, in better radio transmission states, a smaller value of N can be used to suppress the overhead increase while ensuring more transmission opportunities. In poor radio transmission states, on the other hand, it a greater value of N is not used, the overhead increase could be significant. For example, the value of N may be determined as follows.

Users of higher reception SINR: $T_1$=TTI, $T_2$=2×TTI; and
Users of lower reception SINR: $T_1$=TTI, $T_2$=4×TTI, where $T_1$ represents a cycle of subframes where the first control information including the retransmission control information can be transmitted and $T_2$ represents a cycle of subframes where the second control information including control information other than the retransmission control information can be transmitted.

(2) The CQI (Channel Quality Indicator) derived from the reception SINR of downlink pilot channels and reported from user apparatuses also corresponds to quality of radio transmission states. For this reason, if the CQI is good, a smaller value of N may be set. On the other hand, if the CQI is not good, a greater value of N may be set. For example, the value of N may be determined as follows.

Users of higher CQI: $T_1$=TTI, $T_2$=2×TTI; and
Users of lower CQI: $T_1$=TTI, $T_2$=4×TTI (3) The distance between users and the base station also corresponds to quality of radio transmission states. The distance may be estimated based on average signal quality such as pathloss or directly measured with GPS or others. If the distance is short, for example, if a user locates near the base station, a smaller value of N may be set. On the other hand, if the distance is long, for example, if a user locates in cell boundaries, a greater value of N may be set. For example, the value of N may be determined as follows.

Users near the base station: $T_1$=TTI, $T_2$=2×TTI; and
Users away from the base station: $T_1$=TTI, $T_2$=4×TTI (4) If a user has higher mobility (higher Doppler frequency), the user apparatus is moving faster, resulting in more frequent variations of the radio transmission state. For this reason, it is desired to ensure the opportunity to transmit control information to such a user with a higher frequency, and thus it is better to set a smaller value of N. On the other hand, if a user has lower mobility, then the user apparatus is moving more slowly, resulting in infrequent variations of the radio transmission state. For this reason, it is not necessary to ensure opportunities to transmit the control information to such a user, and thus a greater value of N may be set. For example, the value of N may be determined as follows.

Users of higher mobility: $T_1$=TTI, $T_2$=2×TTI; and
Users of lower mobility: $T_1$=TTI, $T_2$=4×TTI (5) If a user requests higher signal quality (QoS), it is necessary to transmit signals to the user with smaller delay. For this reason, it is better to set control information on the user with a high frequency, and thus a smaller value of N is set. On the other hand, it a user requests lower signal quality (QoS), signals to the user may be slightly delayed. For this reason, it is not necessary to set the control information on the user with a high frequency, and thus a greater value of N may be set. For example, the value of N may be determined as follows.

Users requesting higher QoS: $T_1$=TTI, $T_2$=2×TTI; and
Users not requesting higher QoS: $T_1$=TTI, $T_2$=4×TTI The determination criteria (1)-(5) may be applied singular or in combinations. Also, other determination criteria may be applied.

In the above-mentioned embodiments, the control information is classified into the first and second control information, and the first control information and the second control information are transmitted in subframes arriving in the first cycle and the second cycle, respectively. However, these numeral values are simply illustrative. The control information may be classified into the first through third control information, and the first through third control information may be transmitted in subframes arriving in the first through third cycles, respectively.

FIG. 7 illustrates cycle variations depending on distances between a user and a base station where the control information is classified into three or more control information. In the illustration, the distance L increases in ascending order of numbers in the suffix ($L_1 < L_2 < L_3 < L_4 < \ldots$). In addition to the distance, the above and other determination criteria may be used. In this manner, the control information may be classified into any number of control information pieces, and any number of values of N may be used.

In the above-mentioned embodiments, the first and second control information are transmitted in downlinks, but the present invention is also applicable to the control information transmitted in uplinks. In this case, a user apparatus transmits the uplink control information in accordance with the TTI information determined at a base station apparatus. The uplink first control information including retransmission information on downlink data channels or others is transmitted in subframes frequently arriving at the first cycle. The uplink second control information other than the retransmission control information is transmitted in subframes arriving at the second cycle. From the technical viewpoint, a user apparatus may determines the TTI information. However, it is desirable that a base station apparatus makes final decision on the TTI information from the viewpoint of system security and appropriate management.

INDUSTRIAL APPLICABILITY

The present invention may be applied to any appropriate mobile communication system where radio resources are shared among users through scheduling. For example, the present invention may be applied to HSDPA/HSUPA scheme W-CDMA systems, LTE scheme systems, IMT-Advanced systems, WiMAX scheme systems, Wi-Fi scheme systems and so on.

The present invention has been described with reference to the specific embodiments, but the embodiments are simply illustrative, and those skilled in the art will understand various variations, modifications, alterations and substitutions. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2008-051087 filed on Feb. 29, 2008, the entire contents of which are hereby incorporated by reference.

The invention claimed is:

1. A communication apparatus in a mobile communication system, comprising:
a first control information generation unit configured to generate first control information including retransmission information on a previously received data channel;
a second control information generation unit configured to generate second control information including scheduling information on radio resources; and
a control signal generation unit configured to generate a control signal including a lower layer control channel including at least one of the first control information and the second control information,
wherein the control signal generation unit generates the control signal to transmit the first control information in any of subframes arriving at a first cycle and to transmit the second control information in any of subframes arriving at a second cycle longer than the first cycle, and the second cycle is equal to an integral multiple of the first cycle.

2. The communication apparatus as claimed in claim 1, wherein the integral multiple is changed depending on a user radio transmission state of a user.

3. The communication apparatus as claimed in claim 2, wherein the radio transmission state of the user is estimated based on distance between the user and the communication apparatus.

4. The communication apparatus as claimed in claim 2, wherein the radio transmission state of the user is estimated based on moving speed of the user.

5. The communication apparatus as claimed in claim 1, wherein the integral multiple is changed depending on user's requested signal quality (QoS).

6. The communication apparatus as claimed in claim 1, further comprising:
a third control information generation unit configured to generate third control information,
wherein the control signal generation unit generates the control signal to transmit the third control information in any of subframes arriving at a third cycle longer than the first cycle.

7. A method for use in a communication apparatus in a mobile communication system wherein if a data channel has been previously received, first control information including retransmission information on the data channel is generated, the method comprising the steps of:
generating a lower layer control channel including at least one of the first control information and second control information including scheduling information on radio resources and generating a control signal including the lower layer control channel,
wherein the step of generating the control signal comprises generating the control signal to transmit the first control information in any of subframes arriving at a first cycle and to transmit the second control information in any of subframes arriving at a second cycle longer than the first cycle, and the second cycle is equal to an integral multiple of the first cycle.

8. A base station apparatus in a mobile communication system, comprising:
a first control information extraction unit configured to, if a downlink data channel has been previously received, extract first control information including retransmission information on the downlink data channel from a received uplink lower layer control channel;
a second control information extraction unit configured to extract second control information from the uplink lower layer control channel or other uplink lower layer control channels;
a downlink transmission signal transmitting unit configured to transmit a downlink transmission signal in accordance with the first control information, wherein the downlink transmission signal has not been transmitted or is to be retransmitted,
wherein the first control information is received in any of subframes arriving at a first cycle, and the second control information is received in any of subframes arriving at a second cycle longer than the first cycle, and the second cycle is equal to an integral multiple of the first cycle.

9. A user apparatus in a mobile communication system, comprising:
a first control information extraction unit configured to receive a downlink lower layer control channel and extract first control information including retransmission information on a previously transmitted uplink data channel;
a second control information extraction unit configured to extract second control information including scheduling information on radio resources from the downlink lower layer control channel or other downlink lower layer control channels; and
an uplink transmission signal transmitting unit configured to transmit an uplink transmission signal in accordance with the first control information, wherein the uplink transmission signal has not been transmitted or is to be retransmitted, wherein inclusion of the first control information in any of subframes arriving at a first cycle and inclusion of the second control information in any of subframes arriving at a second cycle longer than the first cycle are indicated from a base station apparatus to the user apparatus beforehand, and the second cycle is equal to an integral multiple of the first cycle.

10. A user apparatus in a mobile communication system, comprising:

a first control information generation unit configured to generate first control information including retransmission information on a downlink data channel; and an uplink control signal generation unit configured to generate an uplink lower layer control channel including at least one of the first control information and second control information, the second control information including scheduling information on radio resources, and to generate an uplink control signal including the uplink lower layer control channel, wherein the uplink control signal generation unit generates the uplink control signal to transmit the first control information in any of subframes arriving at a first cycle and to transmit the second control information in any of subframes arriving at a second cycle longer than the first cycle, and the second cycle is equal to an integral multiple of the first cycle.

11. A mobile communication system including a user apparatus and a base station apparatus, the user apparatus comprising:

a first control information generation unit configured to generate first control information including retransmission information on a downlink data channel; and an uplink control signal generation unit configured to generate an uplink lower layer control channel including at least one of the first control information and second control information, the second control information including scheduling information on radio resources, and to generate an uplink control signal including the uplink lower layer control channel, the base station apparatus comprising:

a first control information extraction unit configured to, if a downlink data channel has been previously received, extract the first control information from a received uplink lower layer control channel;

a second control information extraction unit configured to extract the second control information from the uplink lower layer control channel or other uplink lower layer control channels; and a downlink transmission signal transmitting unit configured to transmit a downlink transmission signal in accordance with the first control information, wherein the downlink transmission signal has not been transmitted or is to be retransmitted, wherein the uplink control signal generation unit generates the uplink control signal to transmit the first control information in any of subframes arriving at a first cycle and to transmit the second control information in any of subframes arriving at a second cycle longer than the first cycle, and the second cycle is equal to an integral multiple of the first cycle.

* * * * *